May 18, 1926.
G. H. HIGBEE, JR
1,584,938
ADJUSTABLE MIRROR MOUNTING
Filed Feb. 23, 1922
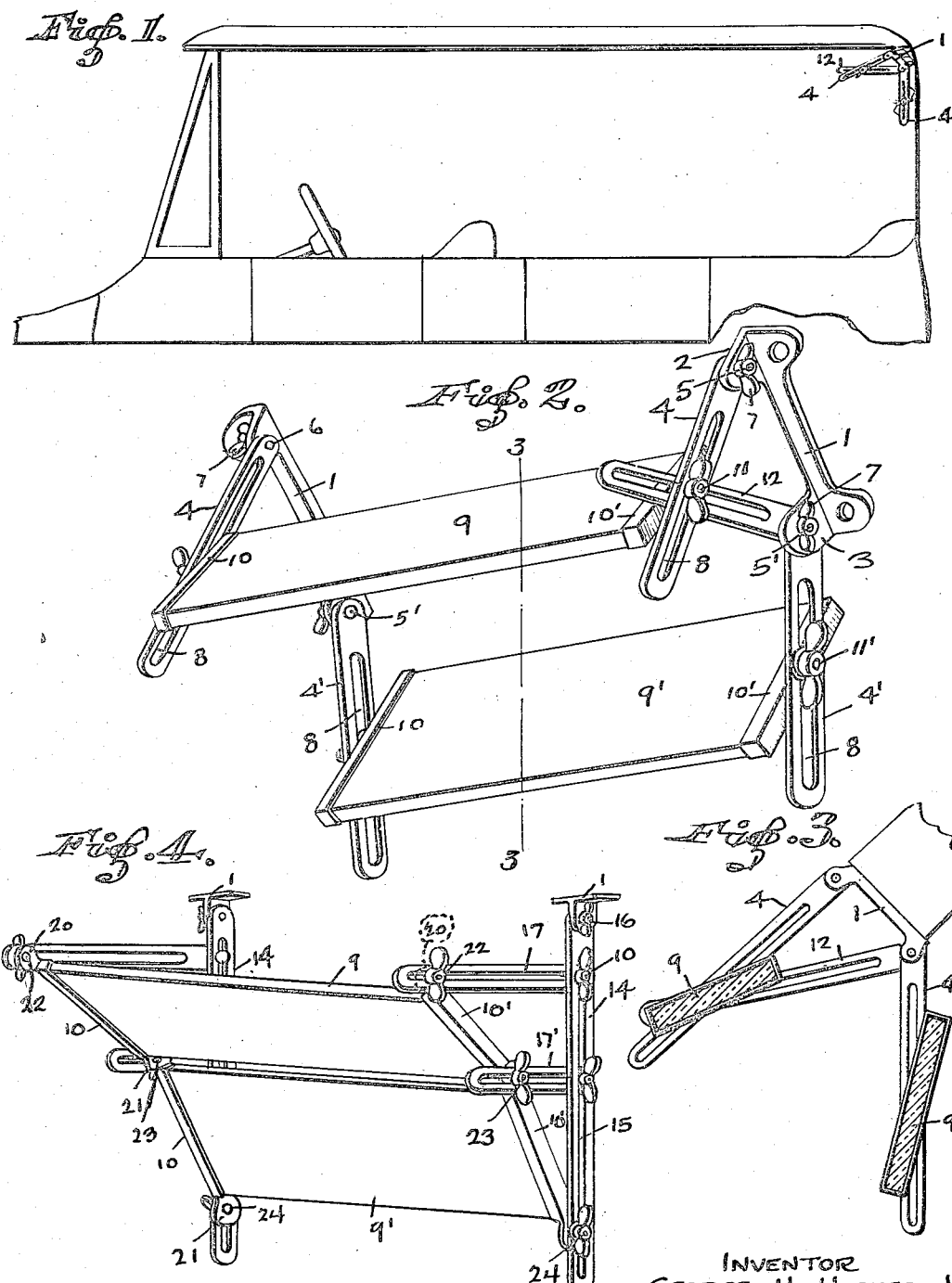
INVENTOR
GEORGE H. HIGBEE, JR.
BY- ATTORNEY Patented May 18, 1926.

1,584,938

UNITED STATES PATENT OFFICE.

GEORGE H. HIGBEE, JR., OF BERKELEY, CALIFORNIA.

ADJUSTABLE MIRROR MOUNTING.

Application filed February 23, 1922. Serial No. 538,555.

This invention relates particularly to an adjustable mounting for windows, mirrors and the like.

An object of this invention is to provide a mirror mounting, adapted particularly for use in the interior of the rear of automobile tops, whereby it is possible for the driver to observe the relative position of the vehicle driven, and an adjacent object. A further object of the invention contemplates the construction of a mounting of this character which will be superior in point of simplicity, inexpensiveness of construction, positiveness of operation, and facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the acompanying one sheet of drawings:—

Fig. 1 illustrated side elevation of a vehicle having my mounting arranged therein.

Fig. 2 is an enlarged perspective of a mounting constructed in accordance with my invention.

Fig. 3 is a cross section taken through Fig. 2 on the line 3—3.

Fig. 4 is a perspective of a modified form of mounting.

Automobiles, and other vehicles provided with tops or closed bodies thereon, as a matter of necessity, are provided with apertures or transparent coverings in the rear parts of the tops whereby the driver or operator may gain a view of the road in the rear. In thickly populated districts, where an automobile is parked or stopped at a curbing between two spaced objects, it is difficult for the driver to reach the desired stopping point, without either leaning out from the side of the vehicle, and looking to the front and rear or by having a person direct the movements of the said automobile. Under such conditions, it is extremely difficult to measure the relative distance between the rear of the automobile driven and an adjacent object. My invention contemplates a mounting adapted to hold mirrors, which will be so arranged within the interior of the rear part of the automobile top that a driver will be able to view the rear vicinity of his machine and back his automobile within close proximity of adjacent objects.

In detail, the construction illustrated in the drawings comprises brackets or base members 1, adapted to be fixedly secured, in a predetermined position, to a stationary part, within the interior of the rear part of an automobile or vehicle body or top. Opposite ends of the bracket 1 are provided with projecting lugs 2 and 3 integrally formed thereon and suitably drilled. Arm members 4 and 4', drilled to correspond with the openings provided in the lugs, are adapted to be secured to said respective lugs by the connecting pivot pins 5 and 5'. The pivot pins 5 and 5', have enlarged head portions 6 and the ends of the said pins 5 and 5' are threaded to receive the wing nuts 7 or other similar adjusting nut with finger means thereon to aid in its rotation. When the arms 4 and 4' are placed in position on the bracket 1 by the pins 5 and 5' it becomes possible to adjust the angular position of said arms according to the frictional adjustment placed on the wing nuts 7. The arms 4 and 4' are provided with slots or elongated openings 8 therein extending substantially the entire length of said arms.

In assembling a mounting in accordance with my invention, a pair of brackets, 1, with the arms 4 and 4' suitably arranged thereon, would be spaced a predetermined distance. Mirrors 9 and 9' with frames 10 and 10', fixedly secured to the opposite ends thereof having threaded shafts 11 and 11' thereon, would be passed through the slots 8 in the arm 4 and 4', respectively and nuts 7 or the equivalent means, placed into threaded engagement with the said threaded shafts 11 and 11'. By regulating the adjustment on the wing nuts 7, it is possible to place the mirrors 9 and 9' in such angular positions that any desired object might be sighted. In order to maintain the mirrors in the desired spaced relation, an auxiliary connecting arm 12 could be either pivotally secured to the lug 3 and slidably secured to the pivot 11 on the mirror 9 or the pivot end 3 of the arm 12 could be placed about the pivot 11'. Any number of such similar combinations are possible within the purview of this invention.

A modification of the invention is shown in Fig. 4 wherein the brackets 1 are provided with depending arms 14 pivotally secured thereto by the adjustable wing nut 16. The arms 14 are slotted as at 15. The ends of supporting arms 17 and 17' are adapted to be mounted adjacent the slots 15 and pivotal adjusting means 11 passed there through for frictionally locating the said arms 17 and 17' relative to the depending members 14. Each of the arms 17 and 17' are slotted intermediate the ends. Mirrors 9 and 9' mounted in the frames 10 and 10' are adapted to be spaced or interposed between said arms 14, 17 and 17'. Each of the frames 10 and 10' are provided with drilled bearings 20 and 21 on the ends thereof and which are adapted to receive the pivot pins 22, 23 and 24 passing through the bearings 20 and 21, and the respective slots in the arm members 14, 17 and 17'. Threaded wing nuts 7 are adapted to engage the threaded ends of the pivot pins 22, 23 and 24 for controlling and adjusting the relations of the mirrors 9 and 10 relative to each other to the various arms forming the mirror mounting.

Having thus described this invention what I claim and desire to secure by Letters Patent is:—

1. A rear view mirror comprising a base adapted to be secured to the rear end of a vehicle top having a rear window therein; a pair of slotted arms adjustably mounted on each of the opposite ends of said base; a pair of mirrors; means to adjustably support the ends of each of said mirrors between the pairs of slotted arms so that the reflecting surface of one mirror faces at an angle to the reflecting surface of the other mirror to reflect on one mirror the images reflected on the other mirror through the rear window in the vehicle top.

2. A rear view mirror comprising a base; a pair of arms adjustably mounted on each of the opposite ends of said base; a pair of mirrors; means to adjustably support the ends of each of said mirrors between the pairs of arms so that the reflecting surface of one mirror faces at an angle to the reflecting surface of the other mirror to reflect in a forward direction on the first mentioned mirror the images reflected on the second mentioned mirror from the rear of the first mentioned mirror.

In testimony whereof, I have hereunto set my hand at San Francisco, California, this 18th day of November, 1921.

GEORGE H. HIGBEE, Jr.